United States Patent [19]
Zorn

[11] Patent Number: 4,536,106
[45] Date of Patent: Aug. 20, 1985

[54] HEAVY DUTY HOB

[75] Inventor: Walter Zorn, Pforzheim, Fed. Rep. of Germany

[73] Assignee: Walztechnik Saacke Zorn GmbH & Co., Pforzheim, Fed. Rep. of Germany

[21] Appl. No.: 546,289

[22] Filed: Oct. 28, 1983

[30] Foreign Application Priority Data

Nov. 11, 1982 [DE] Fed. Rep. of Germany ....... 3241696

[51] Int. Cl.³ .............................................. B23F 21/16
[52] U.S. Cl. .................................................... 407/25
[58] Field of Search .............................. 407/20, 21-29, 407/59, 62, 113, 61, 41, 49

[56] References Cited

U.S. PATENT DOCUMENTS

| | | | |
|---|---|---|---|
| 829,081 | 8/1906 | Moras | 407/113 |
| 1,867,161 | 7/1932 | Leahy | 407/28 |
| 2,690,610 | 10/1954 | Begle | 407/113 |
| 3,298,254 | 1/1967 | Vassallo | 407/113 |
| 3,380,137 | 4/1968 | MacPetrie et al. | 407/62 |
| 4,218,159 | 8/1980 | Langen | 407/25 |

FOREIGN PATENT DOCUMENTS

| | | | |
|---|---|---|---|
| 138285 | 10/1979 | Fed. Rep. of Germany | 407/25 |
| 20494 | 2/1977 | Japan | 407/25 |
| 22196 | 2/1977 | Japan | 407/25 |

Primary Examiner—Leonidas Vlachos
Assistant Examiner—Jerry Kearns
Attorney, Agent, or Firm—Balogh, Osann, Kramer, Dvorak, Genova & Traub

[57] ABSTRACT

A heavy-duty hob for hobbing gears comprises a cylindrical body formed in its peripheral surface with generally axially extending grooves, and tooth-carrying bars, which extend in said grooves and carry cutting teeth which radially protrude from said body and constitute a helical array around the body. It is an object of the invention to avoid the disadvantages of known hobs, to provide the hob with easily replaceable cutting tips, and to permit the use of stable bar-shaped cutting tips which have no through bores and can be used in a plurality of positions and regardless of the module of the gear to be cut extend throughout the length of that side face of the associated tooth which engages the cutting tip. This is accomplished in that the teeth protrude in the cutting direction from the associated tooth-carrying bars, the leading surface of each tooth is formed with an angle-section groove, which is open on four sides, and a bar-shaped cutting tip is detachably secured to each tooth in its said grooves so that the ends and the cutting faces of the cutting tip protrude from said tooth.

3 Claims, 5 Drawing Figures

HEAVY DUTY HOB

This invention relates to a high-efficiency hobbing cutters for hobbing gears. The cutter (hob) comprises a cylindrical body having generally axially extending grooves and tooth-carrying bars, which are inserted in said grooves and carry teeth which form a helical array around the body of the hob.

Such hobs having inserted teeth are known and in accordance with Laid-open German Application No. 17 52 707 may consist of a plurality of discs, each of which is provided with one series of cutting teeth forming one convolution of a helix so that the seats for the cutting teeth can be machined. Pins are then fitted into the several discs to join them so as to form the hob. In that case, the several discs must have exactly identical dimensions and the connecting pins are subjected to strong shear forces during the hobbing operation.

From Laid-open German Application No. 30 39 076 it is known to use sector-shaped teeth, which carry the cutting tips, and to secure said teeth by means of screws in helical grooves formed in the cylindrical body. That design has also been used to permit a machining of the seats for the cutting tips. The sector-shaped teeth arranged in a helical array involve high manufacturing expenses and the fixing screws must take up the entire cutting forces exerted during hobbing.

Just as in the known design described first, the grooves formed in the teeth and receiving the cutting tips cannot extend as far as to the body because material is required for the screws by which the cutting tips are secured to the teeth. That design results in a decrease of the clearance for the removal of chips. In both cases, the cutting tips must be detachably secured to the teeth by means of screws, which extend through the teeth so that the latter are weakened and must be divided and the number of cutting edges which are effective during each revolution is reduced.

Such hobbing cutters are known according to the Austrian Pat. No. 301,300 where the tooth tips have recesses, the surfaces of which form supports for axial and radial positioning of reversible cutter inserts provided with tip and flank cutting edges and where the reversible cutter inserts can be firmly clamped with the help of clamping elements into recesses.

In this known hobbing cutter, the reversible cutter inserts are rhombic and cutting always to the right or to the left flank. In order to obtain the necessary lead angle to work on the cutting edges, they must be of a comparatively complicated design. The reversible cutter inserts are to be positioned correspondingly to their rhombic form axially and radially on the faces of the recesses of the tooth tips, running in an acute angle toward one another and clamped by means of wedges attachable in the basic body against the rear wall of the recesses. The mentioned surfaces of the recesses can be produced with a precision of fitting in view of the high precision of positioning of the reversible cutting edge inserts, based on their arrangement under an acute angle to each other only at high costs.

Accordingly, the object of the invention is to provide an acceptable hobbing cutter that has reversible cutter inserts of a geometrically simple form and which can be produced at comparably small costs for their exact positioning acceptable surfaces of recesses arranged in the tooth tips.

In a heavy-duty hob comprising a cylindrical body having generally axially extending grooves, which are peripherally spaced apart, tooth-carrying bars extending in said grooves, teeth carried by said bars and constituting a helical array around the hob body, and cutting tips carried by said teeth, wherein said teeth are formed with recesses for receiving said cutting tips in a plurality of cutting positions, and said cutting tips have end and side cutting edges and are adapted to be clamped in said recesses, that object is accomplished in accordance with the invention in that said teeth protrude from said bars in the cutting direction and each recess is formed in one side of the tooth in its leading surface and has the form of an angle-section groove, which is open on four sides, the cutting tips consist of cutting bars which are adapted to cut in a plurality of positions, and the angle-section grooves are so inclined that each bar-shaped cutting tip is arranged to cut with a side cutting edge and an edge cutting edge. Because the bar-shaped cutting tips are arranged in open grooves, the latter can be ground continuously and with very high accuracy to provide locating and supporting surfaces for the bar-shaped cutting tips.

In this arrangement, each tooth defines a re-entrant angle with the associated tooth-carrying bar and may be seated on the adjacent edge of the groove in the hob body. The bottom of the tooth-carrying bar may be spaced from the bottom of the groove in the hob body. As a result, it is not necessary to provide a bottom fit, which can be achieved only with difficulty. The hub body may be formed with spiral grooves for supporting the bar-shaped cutting tips in order to prevent a tilting thereof during the hobbing operation.

Further details of preferred embodiments of heavy-duty hobs according to the invention will now be described with reference to the drawings, in which FIG. 1 is a perspective view showing a hob according to the invention viewed from above, FIGS. 2 and 3 are, respectively, a longitudinal sectional view and a top plan view, which is partly in section, and show a portion of the hob with teeth.

Figure 1:
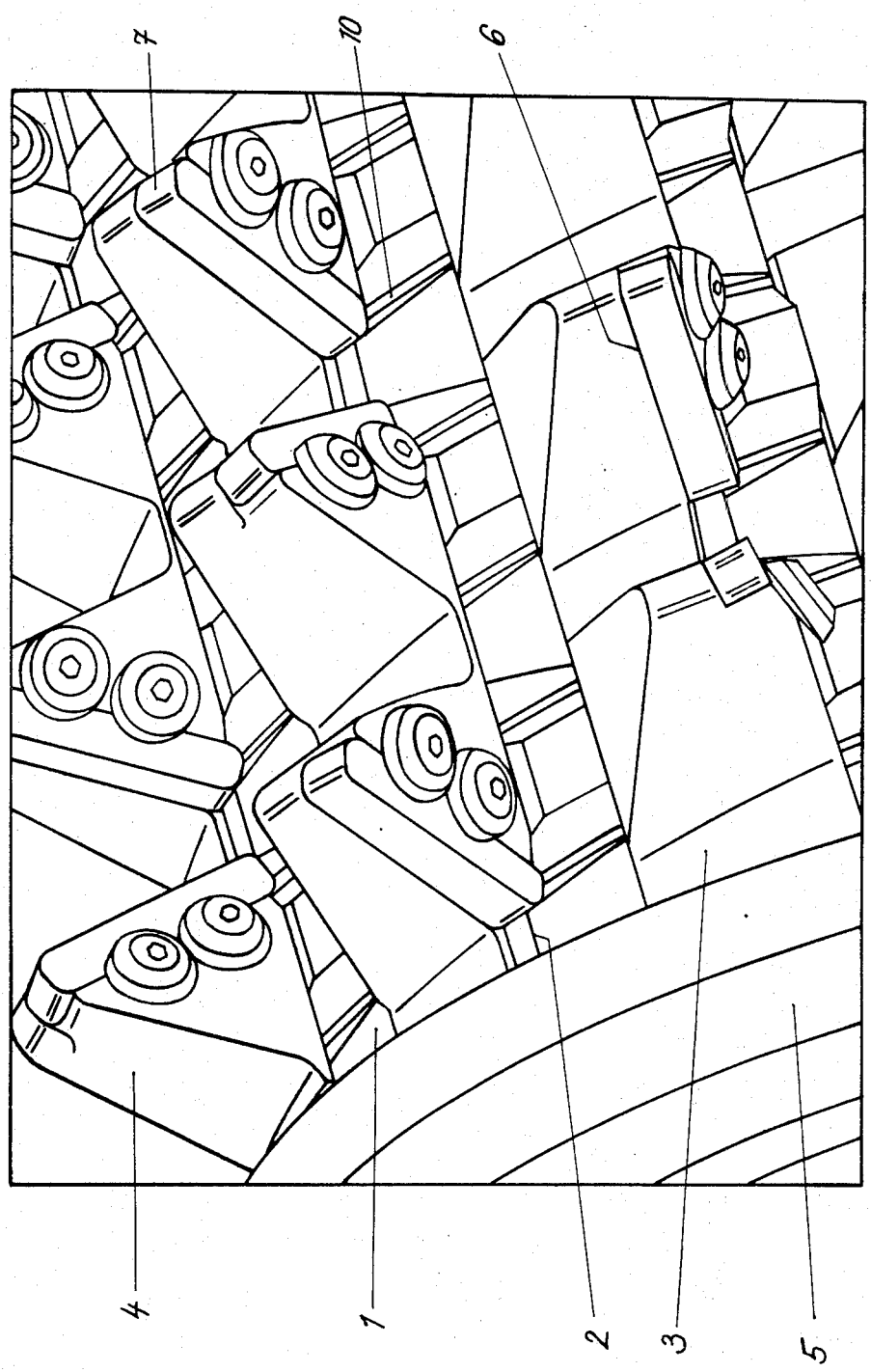

As is apparent from the drawing, particularly from FIG. 1, the heavy-duty hob comprises a cylindrical body 1, which is formed with generally axially extending grooves 2, and tooth-carrying bars 3, which carry teeth 4, which constitute a helical array. The tooth-carrying bars 3 have axially and radially inwardly inclined end faces at both ends and are fixed to the body 1 in the associated axial grooves 2 by means of shrunk-on retaining rings 5, which are formed with axially inwardly facing side faces which conform to the adjacent end faces of the tooth-carrying bars 3.

Figure 4:
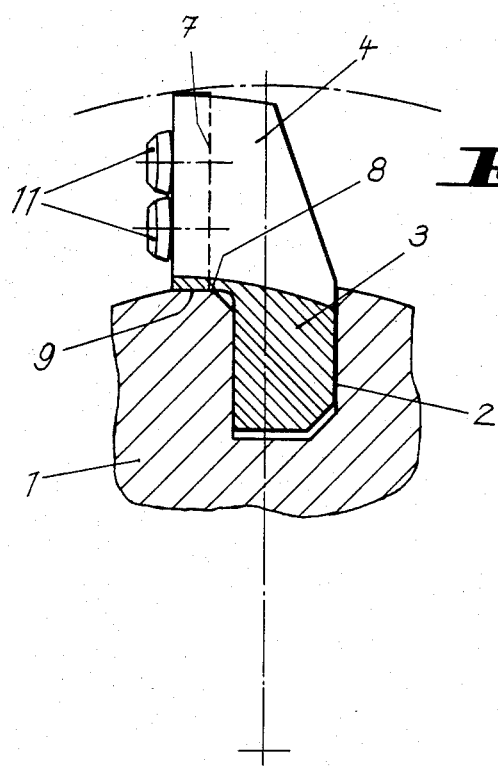
FIG. 4 is a transverse sectional view corresponding to FIG. 2.
Figure 5:
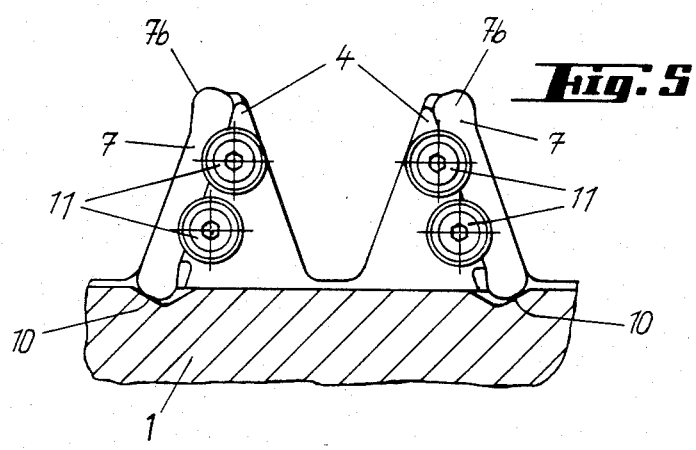
FIG. 5 is an elevational showing another embodiment of teeth provided with bar-shaped cutting tips.

In accordance with the invention the teeth 4 protrude radially outwardly and in the cutting direction from the tooth-carrying bars and each tooth is provided in its leading surface with an angle-section groove 6 for receiving a bar-shaped cutting tip 7 in such a manner that the ends and cutting faces of the cutting tip are exposed. As a result, the angle-section grooves 6 can be precisely ground at their seating surfaces for the bar-shaped cutting tips 7 so that the predetermined clearance angles can be exactly maintained. Each tooth 4 forms with its tooth-carrying bar 3 a re-entrant angle 8, at which the bar and tooth engage the body 1 at the adjacent edge 9 of the associated groove. As a result, the tooth-carrying bar 3 is located not only by means of the transverse groove 2 so that the machining is facilitated, as is apparent from FIG. 4.

Figure 2:
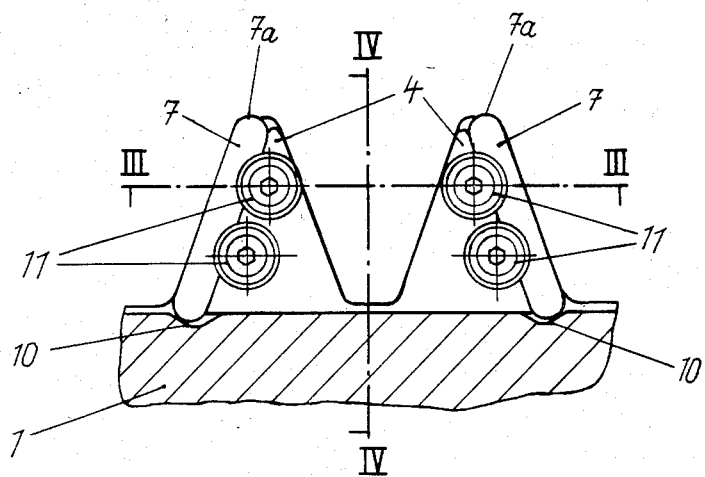

The body 1 is also formed with helical grooves 10, in which the bar-shaped cutting tips 7 are supported on the body 1 in order to prevent a tilting of the cutting tip during the hobbing operation. This is apparent from FIG. 2.

Figure 3:
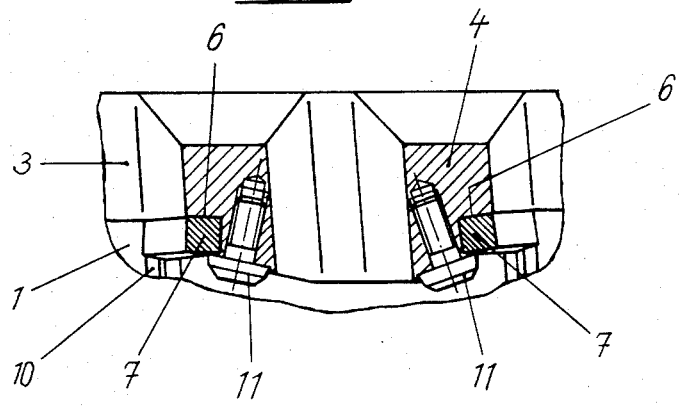

The bar-shaped cutting tips 7 are fixed in the angle-section grooves 6 by means of umbrella-head screws 11, which are screwed into the leading surfaces of the teeth 4, and said leading surfaces of the teeth 4 are recessed to receive part of the head of each of said screws. The bar-shaped cutting tips 7 can easily be turned and replaced when the umbrella-head screws 11 are only slightly loosened, as is apparent from FIG. 3. The screws 11 for fixing the bar-shaped cutting tips 7 provided on the left side of teeth 4 are left-handed screws and the screws 11 for fixing the bar-shaped cutting tips 7 on the right side of teeth 4 are right-handed screws.

The angle-section grooves 6 formed in the teeth 4 may be designed for a fixation of the bar-shaped cutting tips 8 with a side clearance angle of slightly above 0 to 15 degrees and an end clearance angle of slightly above 0 to 30 degrees. In the embodiment shown by way of example, both said clearance angles are about 6°. Those surfaces of each tooth 4 which are engaged by the bar-shaped cutting tip 7 are inclined to determine the desired orientation of the bar-shaped cutting tips 7.

As is apparent, adjacent teeth 4 of each tooth-carrying bar 3 are provided with bar-shaped cutting tips 7 on the left and right sides and this applies also to peripherally adjacent teeth 4 of the helical array. The body 1 is formed with an odd number of axial grooves 2 for receiving the tooth-carrying bars 3, preferably with 13 of such grooves.

What is claimed is:

1. High efficiency hobbing cutter for producing gears, said hobbing cutter comprising a cylindrical body having generally axially extending grooves and tooth carrying bars which are inserted in the grooves, means for retaining said bars in said grooves, said bars having teeth forming a helical array around the body, the improvement wherein a leading edge of each tooth is provided with an angle section groove extending generally radially outwardly of said cutter body, a reversible cutter insert having a cutting tip disposed in each said angle section groove, clamp means securing said insert in said angle section groove, said cutter insert having a rectangular cross-section, said angle section groove being inclined with respect to axial and radial directions of said cylindrical body whereby said angularly oriented angle section groove supports said cutter insert to provide a side clearance and an end clearance to improve the cutting performance of the cutting tip and a helical groove extending axially around said cylindrical body adjacent said helical array, one end of each of said inserts being supported in said groove.

2. High efficiency hobbing cutter according to claim 1, wherein each cutter insert is firmly clamped in said angle section groove with overlapping umbrella head screws partly counter-sunk in a face of the tooth.

3. High efficiency hobbing cutter according to claim 2, wherein the umbrella head screws for fixing the cutter inserts provided on the left side of the teeth are left-handed screws and the screws for fixing the cutter inserts on the right side of the teeth are right-handed screws.

* * * * *